United States Patent [19]
Mullins

[11] Patent Number: 5,195,841
[45] Date of Patent: Mar. 23, 1993

[54] MANHOLE COVER LOCATOR AND METHOD OF PAVING

[76] Inventor: Relis A. Mullins, 4452 Altura St., Eugene, Oreg. 97404

[21] Appl. No.: 698,781

[22] Filed: May 13, 1991

[51] Int. Cl.⁵ .................. G01K 11/06; E02D 29/14; E02B 15/04
[52] U.S. Cl. ........................ 404/72; 404/26; 116/218; 116/217
[58] Field of Search .................. 404/25, 26; 116/216–219; 52/214

[56] References Cited

U.S. PATENT DOCUMENTS

| | | | |
|---|---|---|---|
| 3,362,834 | 1/1968 | Kaye | 116/219 |
| 3,559,615 | 2/1971 | Kliewer | 116/218 |
| 3,724,360 | 4/1973 | Kliewer et al. | 99/342 |
| 3,759,103 | 9/1973 | Volk | 73/358 |
| 3,872,822 | 3/1975 | Ayrer | 116/218 |
| 4,289,088 | 9/1981 | Scibelli | 116/218 |
| 4,356,790 | 11/1982 | Gee | 116/216 |
| 4,421,053 | 12/1983 | Volk | 116/218 |
| 4,748,931 | 6/1988 | Volk | 116/218 |
| 4,818,119 | 4/1989 | Busch et al. | 374/208 |
| 4,947,786 | 8/1990 | Maynard et al. | 116/218 |
| 4,976,568 | 12/1990 | Hess | 404/26 |

*Primary Examiner*—Ramon S. Britts
*Assistant Examiner*—Nancy P. Connolly
*Attorney, Agent, or Firm*—James D. Givnan, Jr.

[57] ABSTRACT

The locator includes a main body having a cup formed therein by an upright wall in which an indicator is slidably disposed. A spring within said main body urges the indicator upwardly to the surface of newly laid molten asphalt. A heat fusible retainer is carried within the upright wall of the main body in the path of the locator to normally retain same in place against spring action. Heat from the asphalt causes fusing of the retainer for release of the indicator which is repositioned to the surface of the asphalt material to facilitate locating of a buried street cover. A method is disclosed for paving a roadway having utility covers in place in the roadway.

15 Claims, 1 Drawing Sheet

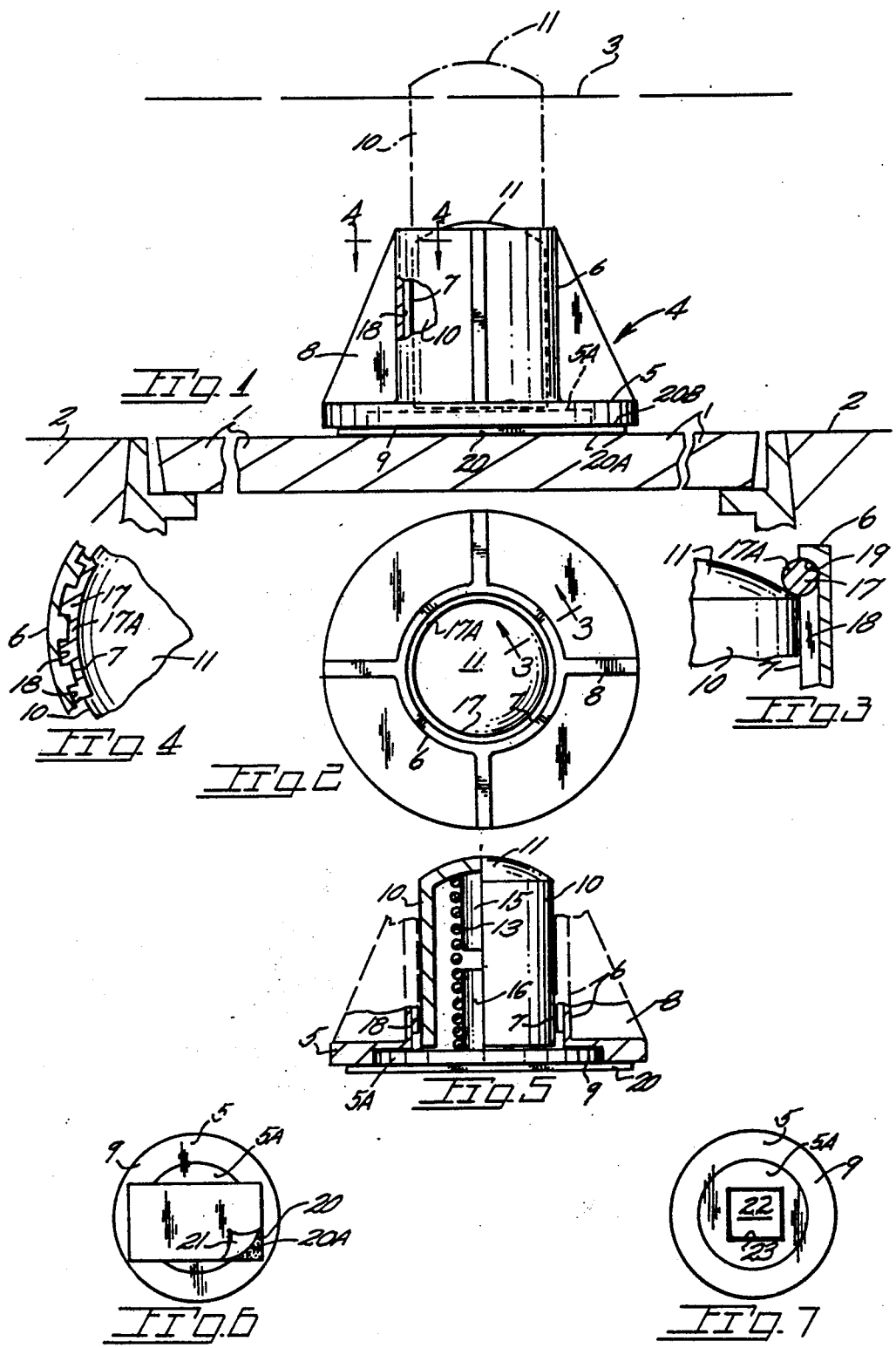

MANHOLE COVER LOCATOR AND METHOD OF PAVING

BACKGROUND OF THE INVENTION

The present invention pertains generally to a device for temporary installation on a cover plate in a roadway to indicate cover location subsequent to a street paving operation.

In the paving of a street or roadway with asphalt it is common practice to provide a continuous overlay of paving material. Upon completion of the paving operation, buried manhole covers and other types of street-located covers are located by use of a metal detector. Upon locating of the manhole or other type cover, the newly laid paving material is removed permitting access to the cover.

The locating of manhole covers and the like by use of a metal detector and then the subsequent removal of paving material therefrom is a costly practice from a man hour standpoint as typically at least two persons are utilized to locate and remove paving material from covers. The problem has been further complicated by the introduction of non-metallic manhole and street utility covers which, of course, prevents finding of the covers by use of a metal detector.

While heat responsive indicators have been used in the culinary field for the indication of food temperatures, such devices are clearly not suitable for use in the present application. Typically such indicators are intended for insertion into meat or other foods with an end of the indicator at all times being exposed.

SUMMARY OF THE PRESENT INVENTION

The present invention is embodied within a street cover locator which is activated by heat of the paving material to release an indicator for biased repositioning through the paved surface prior to hardening. A method includes paving and then locating utility covers.

A base of the present locator is adapted for attachment to a disc shaped cover in place in a street to permit access to various underground utility services. Such covers range from manhole covers to smaller covers of less than a foot in diameter permitting access to water valves. An indicator component of the present device is carried within said base as is a resilient member acting on said component to bias same upwardly toward the surface of the paving material. The temperature of newly laid fluid asphalt is such as to achieve or cause fusing of a retainer of the present device for release of the indicator component. The base of the locator serves to provide attachment means to retain the present device in place on the cover. The indicator component is configured to facilitate biased displacement through the soft asphalt.

Important objectives include the provision of a cover locator attachable to a street located cover and which is responsive to the heat of street paving material to cause the release of an indicator to permit subsequent travel of the indicator to an exposed position; a provision of a locator of but few components which lend themselves to automatic, low cost production methods to permit use of the locator at a substantial cost savings over the old method of locating a street cover with a metal detector or other means; provision of a locator which may be re-usable upon replacement of a fusible member; the provision of a locator for a street cover which is provided with attachment means assuring retention of the locator in place against loads imparted during a paving operation.

BRIEF DESCRIPTION OF THE DRAWINGS

In the accompanying drawings:

FIG. 1 is a side elevational view of the present locator in place on a fragment of a street manhole cover;

FIG. 2 is a plan view of the locator removed from the manhole cover;

FIG. 3 is a fragmentary sectional view along line 3—3 of FIG. 2;

FIG. 4 is a fragmentary sectional view taken along line 4—4 of FIG. 1;

FIG. 5 is a side elevational view of the indicator component of the present device with fragments removed along a medial plane to disclose internal structure;

FIG. 6 is a bottom plan view on a reduced scale of locator base; and,

FIG. 7 is a view similar to FIG. 5 but showing a modified form of the base.

DETAILED DESCRIPTION OF THE PREFERRED EMBODIMENTS

With continuing attention to the drawings wherein applied reference numerals indicate parts similarly hereinafter identified, a reference numeral 1 indicates a street located cover as for example a manhole cover. Various other types of covers are located in streets and roadways which overlie access openings to various subterranean utility passageways. Such covers range in size from several feet to less than one foot at their widest dimension.

An existing street surface is at 2 while the prospective surface of a street surface to be laid is at 3.

With attention now to the present locator, the same includes a main body 4 with a base 5. An upright wall 6 thereon forms a cup which defines a central opening 7. To withstand loads imparted to wall 6 the same may be reinforced by gussets 8. Base 5 is of suitable size to provide a stable platform for the locator. The underside 9 of the base is substantially flat to receive attachment means for attachment to cover 1 as later described.

Carried within the base is an indicator 10 having a top end 11 configured to facilitate passage of the indicator upwardly through the hot asphalt material. For this purpose the upper end of the indicator is preferably domed or shaped to provide an apex for asphalt penetration. Resilient means in the form of a spiral spring 13 is confined between the top end of the indicator and the base of the main body. Bosses at 15 and 16 on the indicator and on the base receive upper and lower end elements of spring 13 which are in snug engagement with the bosses.

For retention of the indicator 10 in place within main body 4 and against the action of spring 13, a heat fusible retainer 17 is provided in an exposed manner in place above and in the path of the indicator. For retainer installation upright wall 6 is provided with internal grooves at 18 terminating upwardly in wall surfaces 19 proximate the wall upper rim. Retainer 17 is preferably of circular shape and may be formed from a wax having a melting point in the range of 150° F.-200° F. An inwardly protruding portion 17A of the retainer overlies the outer rim of the indicator while a castellated outer portion of the retainer in grooves 18 seats upwardly against a lip 19 at the groove upper end 19.

Preferably base 5 is of two-part construction to include a center component 5A which carries spring boss 16. During assembly of the locator, retainer 17 may be inserted into the lower end of open area 7 and positioned upwardly against groove ends 19 in wall 6. The base center component 5A is secured in place in the base by suitable means subsequent to indicator and spring installation. Accordingly indicator 10, and specifically uniformly inclined top end 11 thereof, is confined against movement by spring 13 until fusing of exposed retainer 17.

Attachment means are shown in FIGS. 5 and 6 with the first mentioned Figure showing a double sided, adhesive coated patch 20 having two adhesive surfaces as at 20A-20B for cover and base contact and exposed by the removal of tear-away strips as at 21. A modified attachment means is shown in FIG. 6 wherein a permanent magnet 22 is inset within an opening 23 formed in the underside of base 5.

For urging indicator 10 through a layer of hot asphalt spiral spring 13 should be rated at five pounds or so. Indicator travel may include separated movement subsequent to departure of the indicator from the base of the device. For such travel the spring 13, in frictional engagement with the base boss 15 and the indicator boss 16 serves to impart guidance to the indicator.

A novel method of paving a roadway with utility covers in place includes the steps of positioning indicators on each of the utility covers in the roadway. Applying a continuous layer of hot paving material to the roadway to pave same and to conceal the locators in place on the utility covers. A subsequent step entails the visual sighting of the indicator component of each of the cover installed locators and the removal of paving material from the surface of the cover.

While I have shown but a few embodiments of the invention, it will be apparent to those skilled in the art that the invention may be embodied still otherwise without departing from the spirit and scope of the invention.

Having thus described the invention, what is desired to be secured by a Letters Patent is:

1. A locator for placement on a street supported cover in place in a roadway to be paved with heated material, said locator to provide a visual indication of cover location below the heated material, said locator comprising,
    a main body defining an upward opening area, said main body including a flat base having a surface for surfacial placement on the cover,
    an indicator disposed in said upwardly opening area of the main body,
    a resilient member in said main body in biasing contact with said indicator,
    a heat fusible retainer carrier by said main body and offset upwardly from said base and having a protruding portion in said upwardly opening area in contact with said indicator and restraining said indicator before fusing occurs against the action of said resilient member, and
    said heat fused retainer fusible by the heat of the paving material and permitting displacement of the indicator through the paving material to an exposed position.

2. The locator claimed in claim 1 additionally including attachment means on said main body for attachment of the main body to the street located cover to retain the locator in place during a paving operation.

3. The locator claimed in claim 2 wherein said base includes a substantially flat underside, said attachment means embodied in a double sided adhesive patch on said flat underside.

4. The locator claimed in claim 2 wherein said base includes a substantially flat underside defining an opening, a magnet inset in said opening.

5. The locator claimed in claim 1 wherein said retainer is at least partially superimposed on said indicator, a lip at the upper end of the main body confining the fusible retainer against the action of said resilient member and said indicator.

6. The locator claimed in claim 1 wherein said resilient member is a spiral spring having end segments in frictional engagement with said base and with said indicator for guidance of the indicator when the latter has separated from the base subsequent to fusing of the retainer.

7. A method of paving a roadway and subsequently locating and exposing utility covers in the newly paved roadway, said method consisting of the steps of,
    installing heat actuated locators on the upper surface of each of said covers, said locators each having a spring biased indicator and a fusible retainer,
    applying heated paving material in a continuous manner to the roadway to overlie the roadway and the locators in place on the covers,
    visually sighting the spring biased indicators in the paving material, and
    removing the paving material from each of the covers permitting access to the covers.

8. The locator claimed in claim 1 wherein said indicator has a uniformly inclined top end wall to facilitate indicator penetration of the heated paving material.

9. A locator for use in locating roadway supported covers subsequent to the burial of said covers by the laying of heated paving material on the roadway obscuring the covers from view, said locator comprising,
    a base including an underside having a flat surface to facilitate positioning of the locator on a cover, an upright wall defining a receptacle,
    an indicator housed in said receptacle,
    spring means carried by said base in biasing engagement with said indicator, and
    fusible means carried by said base and upwardly offset from the flat surface of the base and in restraining engagement with said indicator and subject to the heat of said paving material, fusing of said fusible means permitting spring biased displacement of the indicator outwardly from the base and through the paving material to a visible position at the upper surface of the paving material.

10. The locator claimed in claim 9 additionally including attachment means on the flat surface of said base for contact with the cover.

11. The locator claimed in claim 10 wherein said attachment means is a double sided adhesive patch.

12. The locator claimed in claim 9 wherein said indicator has an inclined top end wall of conical shape to facilitate indicator penetration of the paving material.

13. The locator claimed in claim 1 wherein said heat fusible retainer is of castellated configuration.

14. The locator claimed in claim 9 wherein said fusible means is of circular configuration 15. The locator claimed in claim 14 wherein said fusible means has a castellated portion.

* * * * *